Nov. 12, 1963  R. B. McCLARNON  3,110,352
WHEELED VEHICLE STEERING DEVICE
Filed Sept. 15, 1961  2 Sheets-Sheet 1

INVENTOR.
ROSCOE B. McCLARNON.
BY

Nov. 12, 1963 R. B. McCLARNON 3,110,352
WHEELED VEHICLE STEERING DEVICE
Filed Sept. 15, 1961 2 Sheets-Sheet 2

INVENTOR.
ROSCOE B. McCLARNON.
BY

United States Patent Office 3,110,352
Patented Nov. 12, 1963

3,110,352
WHEELED VEHICLE STEERING DEVICE
Roscoe B. McClarnon, St. Henry, Ohio
(634 Linden Ave., Celina, Ohio)
Filed Sept. 15, 1961, Ser. No. 138,323
2 Claims. (Cl. 180—26)

This invention relates to a steering arrangement for a wheeled vehicle in which at least one of the wheels is driven by a power unit carried on the vehicle and wherein the vehicle is of a type requiring a short-turning radius and requiring exceptional features of maneuverability.

In a small vehicle designed to carry one or more persons and wherein the vehicle also carries a small unit for accomplishing work such as a lawn motor carried under the vehicle, or other small implement, and where it is quite necessary that the driver ride on the vehicle and operate the same, it becomes important that the unit be capable of a short turn.

In the case of a so-called riding lawn mower and in certain other types of vehicles and implements, the conventional steering unit is quite cumbersome. When driving a riding lawn mower around objects such as trees, flower beds, or other irregularities in the lawn, it is often necessary to make exceptional turning maneuvers in order to accomplish the close cutting adjacent such objects. However, if it is possible to swing the mower in a very small radius when desired, it is then possible to turn it around a tree, for instance, with one path of cut completely encircling the tree, without using several partial cuts with larger radius of turn as is the case with prior units.

Therefore, a primary object of this invention is to provide a wheeled vehicle capable of power drive, with a steering mechanism which will turn the vehicle on a very short radius of turn at the will of the operator.

It is a further object to provide a wheeled vehicle with a steering device in which one of two front wheels and a rear wheel are mounted on upright steering axes and are connected together to be turned in opposite directions for steering, with the other front wheel mounted with free caster action about an upright axis.

The above and other objects of the invention will appear more fully from the following more detailed description and by reference to the accompanying drawings showing an illustrative embodiment of the invention, wherein.

Figure 1:
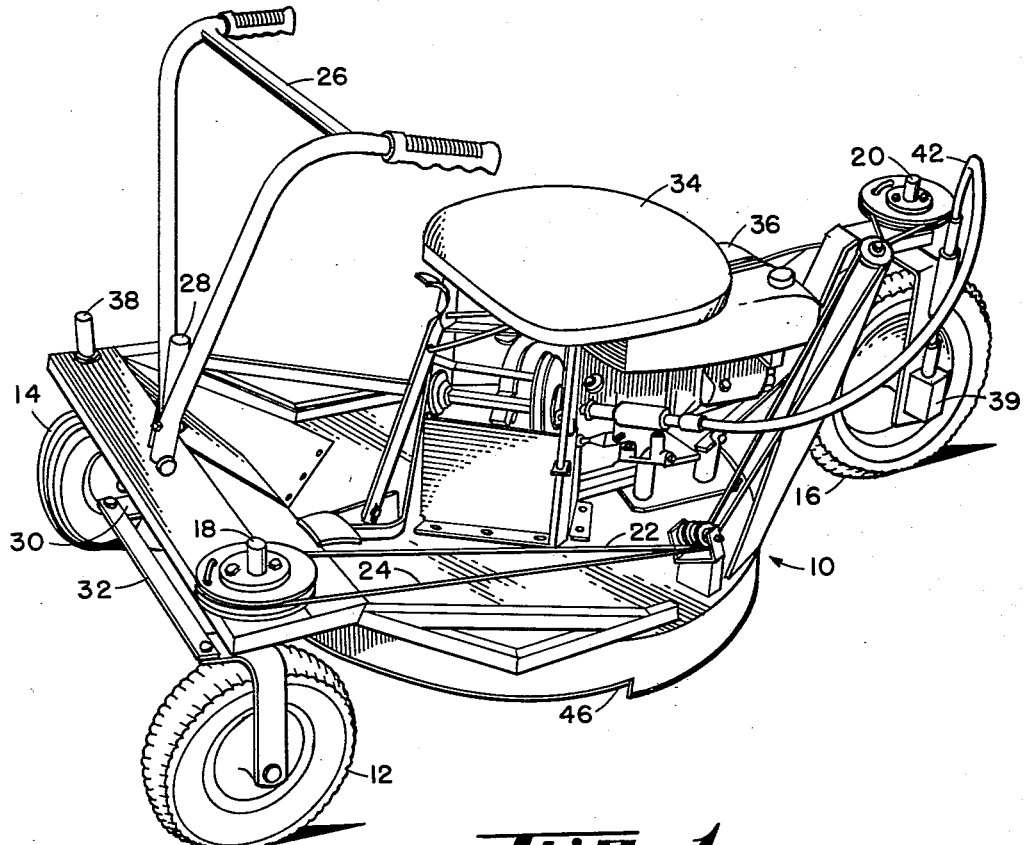
FIG. 1 is a perspective view of a riding type lawn mower to which the principles of the invention have been applied.
Figure 2:
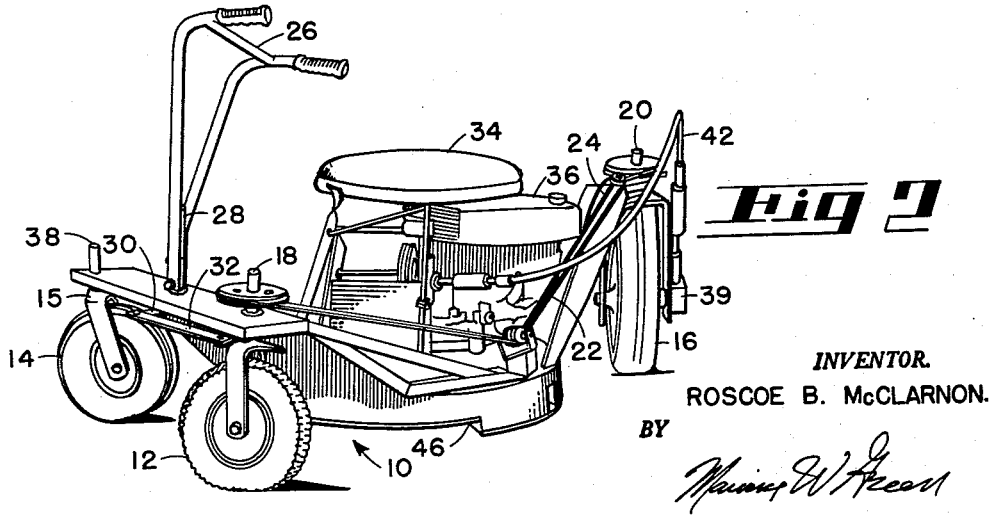
FIG. 2 is another perspective view similar to FIG. 1, but showing the wheels in a position for turning.

Referring to the drawings, and particularly to FIG. 1, a frame 10 is shown, supported on three wheels 12, 14 and 16. The wheels 12 and 14 serve as front wheels for the vehicle, the wheel 12 being steerable on an upright axis of a shaft 18, and the rear wheel 16 being also steerable on an upright axis of a shaft 20. The two wheels 12 and 16 are connected by connecting linkage 22, 24 to be steered together but to turn simultaneously but in opposite directions. The connecting linkage 22, 24, which may take several forms, is here shown for illustration as crossed cables 22 and 24. The steering of the two wheels 12 and 16 may be manually controlled as in this illustration from handle bars 26 which actuate steering post 28 and connect with the wheel steering unit linkage 22, 25 by suitable connecting linkage such as 30, 32. The driver of the vehicle here illustrated is carried on the seat 34, which seat is over the driving motor 36, both the seat and motor being carried on the frame 10.

The other wheel 14 is a front wheel of the vehicle on the opposite side from the wheel 12, which is mounted to caster on the upright pivot steering axis support 38, a caster support with offset bracket 15 for the wheel 14 being so arranged in the vertical axis support 38 as to allow a 360 degree caster action. The caster action is afforded by offset bracket 15 displacing steering axis 38 from the axis of wheel 14 for caster offset. The wheel 16 which is here shown as the rear drive wheel of the vehicle, which is also steerable as has been described, is driven to propel the vehicle from the motor 36 through a flexible drive 42, connected from a vertical position as shown, so as not to interfere with the steering of the wheel 16. A gear box 39 transmits rotation from the flexible drive 42 to the wheel.

In the vehicle illustrated, a rotary blade type mower 46 is carried under the frame 10, and is driven by a vertical shaft (not shown) from the motor 36 as is conventional in such mower drives. The mower per se is not a part of this invention.

Figure 3:
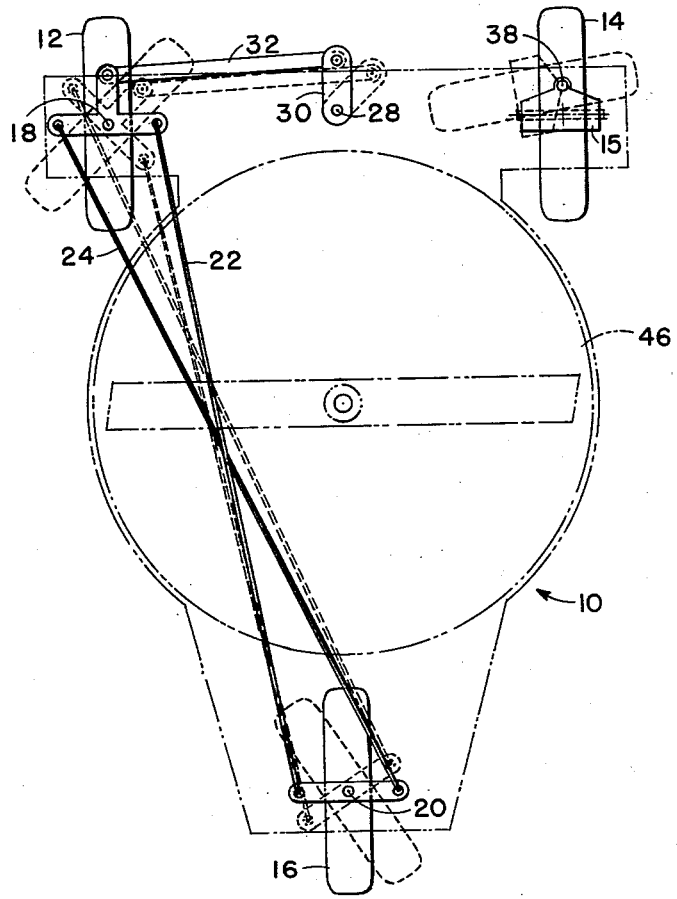
FIG. 3 is a top view partially diagrammatic showing the several components of the drive and steering apparatus with dotted position of the parts for turning.

In operation, the mechanism as above described provides for a connection of the front wheel 12 and the rear drive wheel 16 in such manner that the wheel 12 rotates on its vertical or upright steering axis 18 in a direction opposite from the steering rotation of the rear wheel 16 on its vertical or upright axis 20. Thus, if it is desired to turn the unit toward the right as shown in the diagrammatic top view of FIG. 3, the wheel 12 will turn, while the wheel 16 will turn in the opposite direction and both will take up the positions substantially as shown by the dotted lines. The freely castering front wheel 14 may swing to a position substantially as shown by the dotted line, so the entire unit will turn on a very short radius. Likewise, when it is desired to turn the mechanism in the opposite direction the wheels will line up in opposite directions of steering movement but can still assume a position effecting very short turning radius in the opposite direction.

It is understood that each of the wheels 12, 14, 16, or any one of them, might be designated as wheel units with dual wheels if desired, but each wheel unit with a single upright substantially vertical steering axis.

Also it is noted that the mechanism can be assembled according to the principles of this invention in such a way as to provide the wheel 12 with a fully castered support, with freedom of caster movement, while connecting the rear wheel 16 with the wheel 14 for steering, it being understood that the steering direction of the wheel 14 will be opposite in direction from that of the rear wheel 16, with suitable linkage connections being provided.

It is understood that various mechanisms are contemplated for accomplishing the transmission of the drive to propel the vehicle from the motor 36, the fundamental principle disclosed being the provision of an upright steering axis for the rear wheel unit 16, and the means to transmit the drive to the wheel while still maintaining this steering function in the wheel unit 16. This may be accomplished by several mechanical equivalents.

It is understood that the principles of the mechanism herein described are applicable to various types of vehicles but are perhaps more useful in vehicles where a very short-turning radius is deisred and it is submitted that the mechanism, although not so limited, is particularly applicable to vehicles such as riding lawn mowers, but might further be applicable to implements and vehicles of various forms and uses.

In general it is understood that although the invention has been illustrated by reference to a mechanism found practical in actual operation, it is nevertheless intended that various modifications may be made without depart-

I claim:

1. In a wheeled vehicle steering device having three spaced vehicle supporting wheel units, each of said wheel units supporting a substantial portion of the weight of said vehicle;

two of said wheel units being spaced apart laterally of the vehicle in a plane substantially normal to the direction of travel of the vehicle and both of said wheel units positioned in the forward portion of the vehicle relative to its direction of travel;

and the third of said wheel units being positioned rearward of and between said two forward-positioned wheel units;

supports forming upright steering axes, one adjacent each of said wheel units;

means to propel said vehicle comprising a drive connection for rotating said rearward-positioned wheel unit;

a steering linkage connecting said rearward-positioned wheel unit and one of said forward-positioned wheel units for opposite steering movement about their respective upright steering axes;

a steering member for actuating said linkage;

and an offset support bracket positioning said other forward-positioned wheel unit for free castering steering movement about its upright steering axis with castering freedom independent of said linkage connected wheel units;

said independent castering freedom of said other forward-positioned wheel unit affording an ability of short turn for said vehicle when desired as controlled by said steering member.

2. A wheeled vehicle and steering device therefor comprising:

a vehicle frame;

two front wheel units positioned to support the forward position of said vehicle frame and spaced laterally thereon in a plane substantially normal to the direction of travel of the vehicle;

a rear wheel unit between and rearward of said two front units and positioned to support the rearward portion of said vehicle frame;

said front wheel units and said rear wheel unit each having supports on said frame affording separate upright steering axes;

a steering linkage connecting said rear wheel unit and one of said front wheel units for opposite steering movement about their respective upright steering axes;

a steering member for actuating said linkage;

an offset bracket positioning said other front wheel unit for free castering steering movement about its steering axis with castering freedom independent of said linkage connected front and rear wheel units;

said independent castering freedom of said other front wheel unit affording an ability of short turn for said vehicle when desired as controlled by said steering member.

References Cited in the file of this patent

UNITED STATES PATENTS

| | | |
|---|---|---|
| 654,728 | Grams | July 31, 1900 |
| 1,139,635 | Burris | May 18, 1915 |
| 1,227,630 | Kohne | May 29, 1917 |
| 1,336,823 | Dessaules | Apr. 13, 1920 |
| 1,854,052 | McDowall | Apr. 12, 1932 |
| 2,111,983 | Massey | Mar. 22, 1938 |
| 2,559,379 | Szekely | July 3, 1951 |
| 2,644,540 | Balzer | July 7, 1953 |
| 2,865,159 | Musgrave | Dec. 23, 1958 |
| 2,925,887 | Gibson | Feb. 23, 1960 |